United States Patent

Fuller

[15] 3,663,096
[45] May 16, 1972

[54] WIDE ANGLE VIEWER
[72] Inventor: David L. Fuller, Atlanta, Ga.
[73] Assignee: Scripto, Inc., Atlanta, Ga.
[22] Filed: Sept. 22, 1970
[21] Appl. No.: 74,531

Related U.S. Application Data

[63] Continuation of Ser. No. 794,890, Jan. 29, 1969, abandoned.

[52] U.S. Cl..............................350/238, 350/191, 350/235, 350/296
[51] Int. Cl..................G02b 27/02, G02b 3/06, G02b 5/10
[58] Field of Search..................40/63 A; 350/235, 236, 238, 350/141, 143, 191, 133–135, 293, 296

[56] References Cited

UNITED STATES PATENTS

| | | | |
|---|---|---|---|
| 3,064,376 | 11/1962 | Fuller | 40/63 A |
| 3,424,511 | 1/1969 | Ratliff, Jr. | 350/135 |
| 2,643,577 | 6/1953 | Williams | 350/135 |
| 2,166,988 | 7/1939 | Fosnick | 350/191 |
| 3,153,293 | 10/1964 | Clarkson et al. | 40/63 A |
| 2,495,047 | 1/1950 | Afton et al. | 350/238 X |

Primary Examiner—David Schonberg
Assistant Examiner—Paul A. Sacher

[57] ABSTRACT

A non-distorted image of a panoramic negative is presented to the eye in a viewer having an arcuate film gate and a magnifying system formed of at least one non-spherical lens.

7 Claims, 5 Drawing Figures

PATENTED MAY 16 1972 3,663,096

INVENTOR
DAVID L. FULLER

BY Newton, Hopkins & Ormsby

PATENTED MAY 16 1972

INVENTOR
DAVID L. FULLER

BY Newton, Hopkins & Ormsby

WIDE ANGLE VIEWER

This is a continuation of application Ser. No. 794 890, filed Jan. 29, 1969, now abandoned.

BACKGROUND OF THE INVENTION

Photographic objectives capable of covering a wide horizontal angular field to produce a panoramic image on cylindrical film may be of either the stationary or scanning type. Examples of the former type are disclosed in my previous U.S. Pat. No. 3,251,266, May 17, 1966 and No. 3,361,512, Jan. 2, 1968.

BRIEF SUMMARY OF THE INVENTION

The present invention relates to a film viewer for use in conjunction with negatives or transparencies produced by a camera utilizing wide angle objectives of the types disclosed in my above mentioned patents.

The invention is directed to a housing providing a monocular viewing window, an arcuate film gate, a selectively activated light source behind the window and film gate, and a magnifying lens system between the window and film gate capable of producing an image to the eye which is free from distortion. To this end, the magnifying lens system comprises at least one non-spherical lens.

BRIEF DESCRIPTION OF THE DRAWING FIGURES

DESCRIPTION OF THE ILLUSTRATIVE EMBODIMENT

Figure 1:
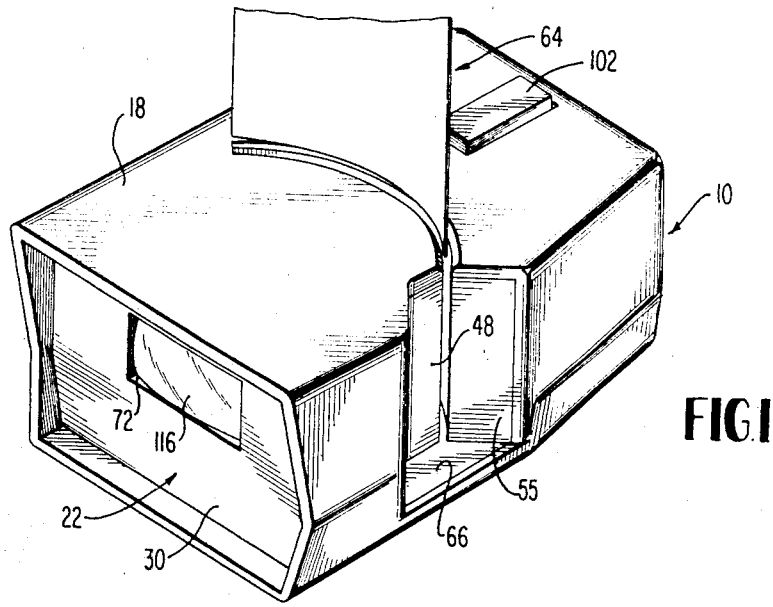
FIG. 1 is a perspective view showing a construction according to the invention.
Figure 2:
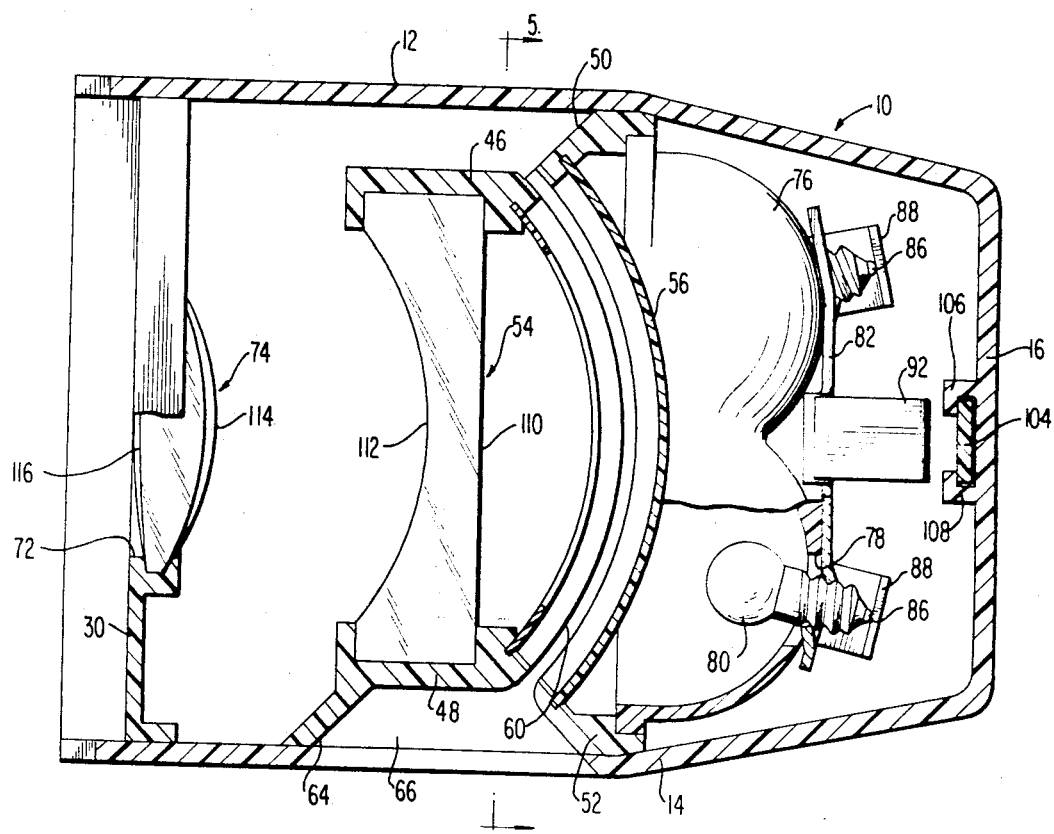
FIG. 2 is an enlarged horizontal section taken through the viewer.
Figure 3:
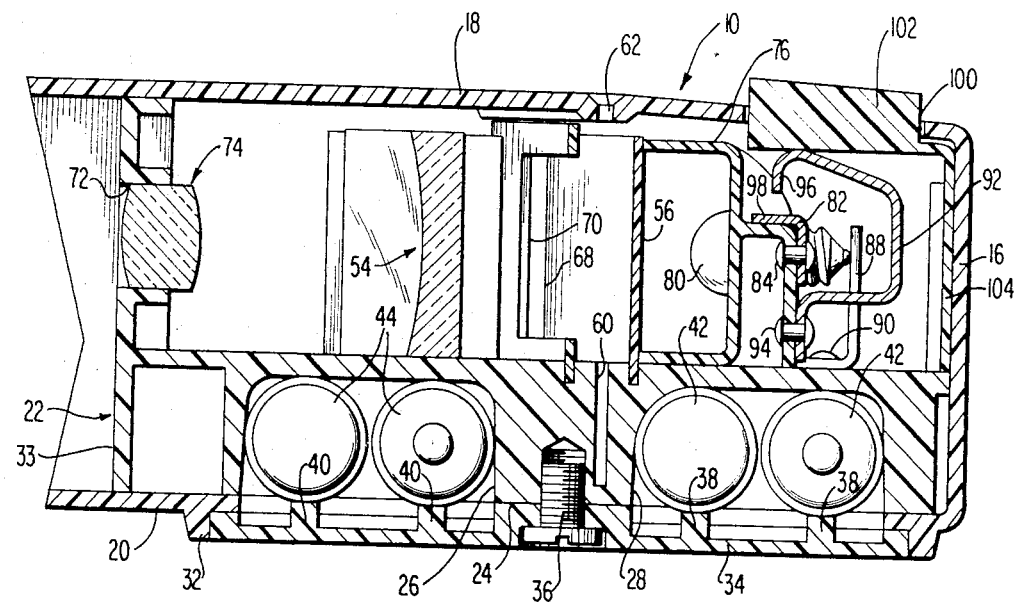
FIG. 3 is an enlarged vertical section taken through the viewer.
Figure 4:
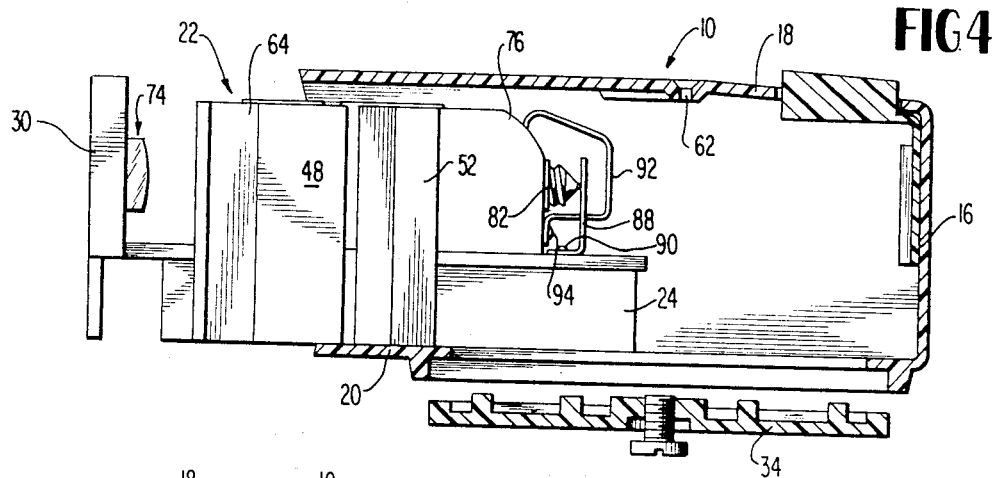
FIG. 4 is a smaller section similar to FIG. 3 but showing the bottom plate removed and the internal mechanism partially withdrawn from the casing.

With reference now more particularly to FIGS. 1—3, the viewer assembly as indicated therein generally by the reference character 10 and will be seen to include an outer casing having opposite side walls 12 and 14, a rear wall 16, and top and bottom walls 18 and 20 presenting a generally rectangular body having an open front. Removably received through the open front of the casing is the inner body indicated generally by the reference character 22 which will be seen to include a base portion 24 having, at its underside, a pair of battery receiving recesses 26 and 28 and provided at its forward end with an upstanding front wall portion 30 which, when the parts are assembled, is somewhat recessed from the forward or opened end edge of the casing. The bottom wall 20 of the casing is provided with an enlarged opening which registers with the battery receiving openings or recesses 26 and 28 substantially as is shown in FIG. 3, and a depending and circumscribing flange 32 is provided around this opening to receive the removable bottom wall portion 34 which, as shown, is provided with a screw fastener 36 by means of which the portion 34 is removably attached to the inner body assembly 22. The bottom wall portion 34, then, serves to locate the inner body assembly 22 within the casing and it is also provided with a series of upstanding ribs 38 and 40 for retaining the batteries 42 and 44, substantially in the fashion shown.

The inner body base portion 24 is provided with upstanding support portions 46 and 48 on opposite sides thereof as is shown in FIG. 2 which are inwardly offset from the respective side walls 12 and 14 of the casing with the portion 48 having an angled wing portion 50 extending to the side wall 12 in the fashion shown and a similar wing portion 52 being provided at the opposite side. The two portions 46 and 48 receive and locate a negative non-spherical lens member indicated generally by the reference character 54 and an arcuate diffusing screen 56 is positioned between the wing portions 50 and 52 and held with respect thereto by reception of its opposite ends in suitable slots formed in such wing portions, and with its lower edge being received in a corresponding arcuate slot in the base portion 24 of the assembly 22, as may be seen in FIG. 3. As is also shown in FIG. 3, and, as well as in FIG. 2, the base portion 24 is provided with a slot 60 which extends arcuately and forms, in conjunction with the arcuate slot 62 in the top wall 18 of the casing, an arcuate film gate adapted to receive the film strip such as that indicated by the reference character 64 in FIG. 1. To facilitate manipulation of the film strip, the side wall 14 of the casing is provided with an opening as is shown in FIG. 2 extending between the wing portion 52 previously described and a further wing portion 64 so as to define a recess 66 which may lend access to one side of the film strip 64 serving to aid in locating the same within the casing. The film strip may be inserted through the top as is shown in FIG. 1 or through the side recess 66.

Figure 5:
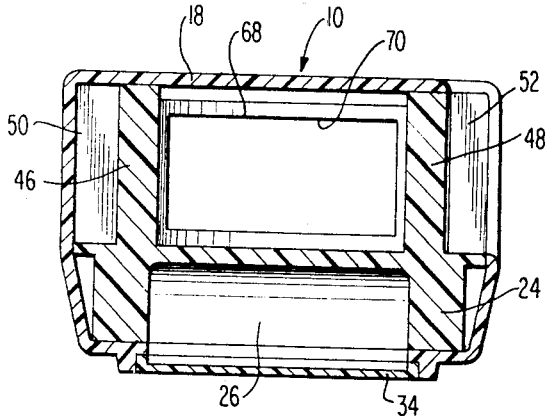
FIG. 5 is a transverse sectional view, on reduced scale, taken substantially along the plane of section line 5—5 in FIG. 2.

Located in front of the film gate 60, 62 is masking device or strip 68 having a rectangular opening 70, the member 68 being received in a suitable arcuate groove in the base portion 24 and extending therefrom into close proximity with the inner surface of the top wall 18 of the casing to prevent the occurrence of stray light passing beyond the mask. For this reason also, the upstanding support portions 46 and 48 and their corresponding wings 50 and 52 also extend upwardly into close proximity with the inner face of the top wall 18, substantially as is shown in FIG. 5. The front wall portion 30 of the assembly 22 is provided with a window opening 72 which receives the positive non-spherical lens 74 aligned with and cooperating with the previously mentioned negative non-spherical lens 54 for viewing the film strip disposed within the gate 60, 62.

Behind the diffusing screen 56 and forming an enclosure therewith is the shield assembly 75 having a pair of ellipsoidal reflectors as will be evident from FIG. 2, each provided with an opening such as that indicated by the reference character 78 for receiving one of a pair of light source bulbs 80. A metallic mounting strip 82 is mounted as by a suitable rivet or like fastener 84 (see FIG. 3) to the assembly 76 and is adapted to receive the bases of the light bulbs so that the terminal ends 86 thereof are in contact with the angle members 88 mounted on the base portion 24 as by means of suitable fasteners 90 as shown in FIG. 3 and which are connected by suitable means in the battery circuit. A spring contact member 92 is attached at one end as by the fastener 94 to the assembly 76 as is shown in FIG. 3 and has a free end portion 96 normally disposed above the tang 98 of the strip 82 and adapted to be reflected downwardly into contact therewith to complete the battery circuit through the light bulbs 80. For selective actuation of this spring strip 92, the top wall 18 of the casing is provided with an opening 100 receiving the body 102 of a push button assembly having, within the casing, and adjacent the rear wall 16 thereof, a mounting stem portion 104 held captive in the guide members 106 and 108 as is shown in FIG. 2 and which stem is sufficiently resilient to allow the body 102 to be deflected downwardly to engage the spring contact 92 against the tang 98 as previously described.

The rear negative lens element 54 will be seen to present a plano rear surface 110 and a toroidal front surface 112, while the front positive lens element 74 presents a toroidal rear surface 114 and a toroidal front surface 116. These lens elements form a magnifying system for presenting, to the eye, an image of the illuminated film strip which is free from distortion in any portion thereof.

The present invention has been disclosed in detail above for the purpose of illustration only, and is not intended to be limited by this description or otherwise, except as defined in the appended claims.

I claim:

1. A monocular film viewer comprising an outer housing having top, bottom side and rear walls, said top wall being provided with an arcuate slot for receiving a film and one of said side walls being provided with a vertical opening into which one end of said arcuate slot opens, said opening extending from the top of said side wall to a point adjacent the bottom thereof, the front of said housing being open and the bottom wall being provided with an opening; a removable inner body assembly located within said housing and provided with a wall portion closing the front end of said housing, said wall portion being provided with a window, said inner body assembly having a bottom portion which completely covers the opening in the bottom of said outer housing, the bottom portion of said inner body assembly being provided with an arcuate slot located directly below and corresponding in shape with the arcuate slot in said outer housing, said slots jointly forming a film gate, a light source behind said film gate, a closure plate for the opening in the bottom of said outer housing and a removable securing means passing through said closure plate and secured at its inner end to the bottom portion of the inner body assembly for holding said housing closure plate, and inner body assembly in assembled position.

2. A film viewer as in claim 1 wherein the bottom portion of the inner body is provided with a downwardly opening pocket adapted to receive a battery, said pocket being covered by said closure plate.

3. A film viewer as in claim 2 wherein the bottom portion of said inner body assembly includes upstanding support portions on opposite sides thereof and a non-spherical lens member is received between said portions.

4. A viewer as in claim 3 in which a curved masking strip having a rectangular opening is located in front of said film gate, the ends of said masking strip being supported in slots in said support portions.

5. A viewer as in claim 4 wherein said support portions are inwardly offset from the respective side walls of the housing and wherein each support portion is provided with a wing portion extending into contact with the adjacent side wall of said housing.

6. A viewer as in claim 5 wherein a diffusing screen is positioned in the rear of the film gate and wherein one end of said screen is supported in a slot in one of said wing portions.

7. A viewer as in claim 6 wherein said light source comprises a pair of light bulbs and an ellipsoidal reflector behind each bulb both of said reflectors being formed from a single piece of metal located behind said diffusing screen and forming therewith a closed chamber.

* * * * *